US012118904B2

(12) United States Patent
Hou et al.

(10) Patent No.: US 12,118,904 B2
(45) Date of Patent: Oct. 15, 2024

(54) ACTIVE ELECTRONIC SHELF LABEL

(71) Applicant: Hanshow Technology Co., Ltd., Zhejiang (CN)

(72) Inventors: Shiguo Hou, Zhejiang (CN); Hongbo Shen, Zhejiang (CN); Jianguo Zhao, Zhejiang (CN); Yujun Lin, Zhejiang (CN); Linjiang Wang, Zhejiang (CN)

(73) Assignee: HANSHOW TECHNOLOGY CO., LTD., Jiaxing (CN)

( * ) Notice: Subject to any disclaimer, the term of this patent is extended or adjusted under 35 U.S.C. 154(b) by 176 days.

(21) Appl. No.: 17/944,879

(22) Filed: Sep. 14, 2022

(65) Prior Publication Data

US 2023/0129609 A1 Apr. 27, 2023

Related U.S. Application Data

(63) Continuation of application No. PCT/CN2020/072619, filed on Jan. 17, 2020.

(51) Int. Cl.
*G09F 3/20* (2006.01)

(52) U.S. Cl.
CPC .............. *G09F 3/208* (2013.01); *G09F 3/204* (2013.01)

(58) Field of Classification Search
CPC ................................ G09F 3/208; G09F 3/204
See application file for complete search history.

(56) References Cited

U.S. PATENT DOCUMENTS 5,461,561 A * 10/1995 Ackerman ........... G06Q 20/203 705/28
5,583,525 A * 12/1996 Nekomoto ............... H04B 5/48 340/5.91

(Continued)

FOREIGN PATENT DOCUMENTS

CN 102215722 10/2011
CN 104281867 1/2015

(Continued)

OTHER PUBLICATIONS

International Searching Authority, "International Search Report and Written Opinion," issued in connection with PCT Application No. PCT/CN2020/072619, with English Translation, dated Oct. 22, 2019, 11 pages.

(Continued)

*Primary Examiner* — Gary C Hoge
(74) *Attorney, Agent, or Firm* — Hanley, Flight & Zimmerman

(57) ABSTRACT

Disclosed in the present disclosure is an active electronic shelf label, including: a shelf label body, a guide rail, a guide rail positive power supply line, a guide rail negative power supply line, a shelf label positive elastic sheet, and a shelf label negative elastic sheet. The shelf label body is connected to the guide rail and movable along the guide rail. The guide rail positive power supply line and the guide rail negative power supply line are respectively provided along the guide rail. A first contact point of the shelf label positive elastic sheet is electrically coupled to a power input terminal of the shelf label body. A first contact point of the shelf label negative elastic sheet is electrically coupled to a power output terminal of the shelf label body. A second contact point of the shelf label positive elastic sheet is electrically coupled to the guide rail positive power supply line by contact, and a second contact point of the shelf label (Continued)

negative elastic sheet is electrically coupled to the shelf label negative elastic sheet by contact. The present disclosure can improve the efficiency of installing and disassembling the electronic shelf label, enables flexible adjustment of the position of the shelf label body on the guide rail according to actual needs, and is simple in structure, light in weight, and easy to maintain.

19 Claims, 3 Drawing Sheets

(56) References Cited

U.S. PATENT DOCUMENTS

| | | | | |
|---|---|---|---|---|
| 6,435,884 | B1 * | 8/2002 | Tada | H01R 25/14 439/94 |
| 9,442,958 | B2 | 9/2016 | Geva et al. | |
| 10,706,749 | B1 * | 7/2020 | White | G09F 3/204 |
| 2002/0032975 | A1 * | 3/2002 | Shin | G09F 3/204 40/466 |
| 2002/0034067 | A1 * | 3/2002 | Massaro | G06F 3/147 361/728 |
| 2004/0217167 | A1 * | 11/2004 | Huang | G09F 3/204 235/383 |
| 2009/0179825 | A1 * | 7/2009 | Enarvi | G06F 3/147 345/30 |
| 2011/0286195 | A1 | 11/2011 | Horikiri et al. | |
| 2012/0044056 | A1 * | 2/2012 | Byun | G06Q 30/0641 340/10.1 |
| 2013/0286564 | A1 * | 10/2013 | Suzuki | G09F 3/208 361/679.01 |
| 2018/0268745 | A1 * | 9/2018 | de Haas | H01R 25/142 |
| 2019/0080633 | A1 * | 3/2019 | Bottine | G06F 3/147 |

FOREIGN PATENT DOCUMENTS

| | | |
|---|---|---|
| CN | 104766552 | 7/2015 |
| CN | 208608434 | 3/2019 |
| CN | 209433710 | 9/2019 |
| CN | 110334793 | 10/2019 |
| CN | 110379297 | 10/2019 |
| CN | 110632668 | 12/2019 |
| KR | 20170052300 | 5/2017 |
| WO | 2019088585 | 5/2019 |

OTHER PUBLICATIONS

International Searching Authority, "International Preliminary Report on Patentability" issued in connection with PCT Application No. PCT/CN2020/072619, with English Translation, dated Jul. 19, 2022, 8 pages.

International Searching Authority, "International Search Report," issued in connection with PCT Application No. PCT/CN2020/072619, English Translation, dated Oct. 22, 2020, 2 pages.

The State Intellectual Property Office of People's Republic of China, "First Office Action," issued In connection with Chinese patent application No. 202010051163.8, mailed Mar. 22, 2022, with English translation, 11 pages.

The State Intellectual Property Office of People's Republic of China, "Search Report," issued in connection with Chinese patent application No. 202010051163.8, mailed Mar. 22, 2022, with English translation, 5 pages.

The State Intellectual Property Office of People's Republic of China, "Second Office Action," Issued in connection with Chinese patent application No. 202010051163.8, mailed Nov. 1, 2022, with English translation, 8 pages.

The State Intellectual Property Office of People's Republic of China, "Search Report," issued in connection with Chinese patent application No. 202010051163.8, mailed Nov. 1, 2022, with English translation, 4 bages.

* cited by examiner

ACTIVE ELECTRONIC SHELF LABEL

CROSS-REFERENCE TO RELATED APPLICATIONS

This application is a National Stage of International Application No. PCT/CN2020/072619, filed Jan. 17, 2020, which is hereby incorporated by reference in its entirety.

TECHNICAL FIELD

The present disclosure relates to a technical field of electronic device, and particularly to an active electronic shelf label.

BACKGROUND

At present, most active electronic shelf labels in the market are designed in a rotatable type, i.e., a fixed metal sheet is provided on a main body of an electronic shelf label, and the metal sheet is contacted with a power supply line in a power supply guide rail by rotation, so as to achieve the power supply and installation of the electronic shelf label. In this method, when the position of the electronic shelf label needs to be adjusted, the electronic shelf label should be rotatablely disassembled from the power supply guide rail and rotatablely installed again, resulting in low efficiency of installation and disassembly. In addition, the rotatable installation mode requires a pre-determined rotation radius, which requires an interval between the electronic shelf labels, resulting in a difficulty in setting the position of the electronic shelf label according to actual needs.

There is no effective solution at present for the above problems.

SUMMARY

The embodiments of the present disclosure provide an active electronic shelf label for improving the efficiency of installation and disassembly thereof, the active electronic shelf label including:

- a shelf label body 1, a guide rail 2, a guide rail positive power supply line 3, a guide rail negative power supply line 4, a shelf label positive elastic sheet 5 and a shelf label negative elastic sheet 6;
- wherein the shelf label body 1 is connected to and movable along the guide rail 2;
- the guide rail positive power supply line 3 and the guide rail negative power supply line 4 are provided along the guide rail 2, respectively;
- a first contact point of the shelf label positive elastic sheet 5 is electrically coupled to a power input terminal of the shelf label body 1; a first contact point of the shelf label negative elastic sheet 6 is electrically coupled to a power output terminal of the shelf label body 1;
- a second contact point of the shelf label positive elastic sheet 5 is electrically coupled to the guide rail positive power supply line 3, and a second contact point of the shelf label negative elastic sheet 6 is electrically coupled to the guide rail negative power supply line 4.

In the embodiment of the present disclosure, the shelf label body is movably connected to the guide rail, the guide rail positive power supply line and the guide rail negative power supply line are provided along the guide rail, respectively, the first contact point of the shelf label positive elastic sheet is electrically coupled to the power input terminal of the shelf label body, the first contact point of the shelf label negative elastic sheet is electrically coupled to the power output terminal of the shelf label body, the second contact point of the shelf label positive elastic sheet is electrically coupled to the guide rail positive power supply line, and the second contact point of the shelf label negative elastic sheet is electrically coupled to the guide rail negative power supply line. Therefore, the present disclosure improves the efficiency of installing and disassembling the electronic shelf label, enables flexible adjustment of the position of the shelf label body on the guide rail according to actual needs, and is simple in structure, light in weight, and easy to maintain.

BRIEF DESCRIPTION OF THE DRAWINGS

For a clearer illustration of technical features in the embodiments of the present disclosure or the prior art, a brief description of the drawings for the embodiments or the prior art will be given below. Obviously, the drawings described below involve only some embodiments of this disclosure. For those of ordinary skill in the art, other drawings can be derived from these drawings without any inventive efforts. In the drawings.

Figure 1:
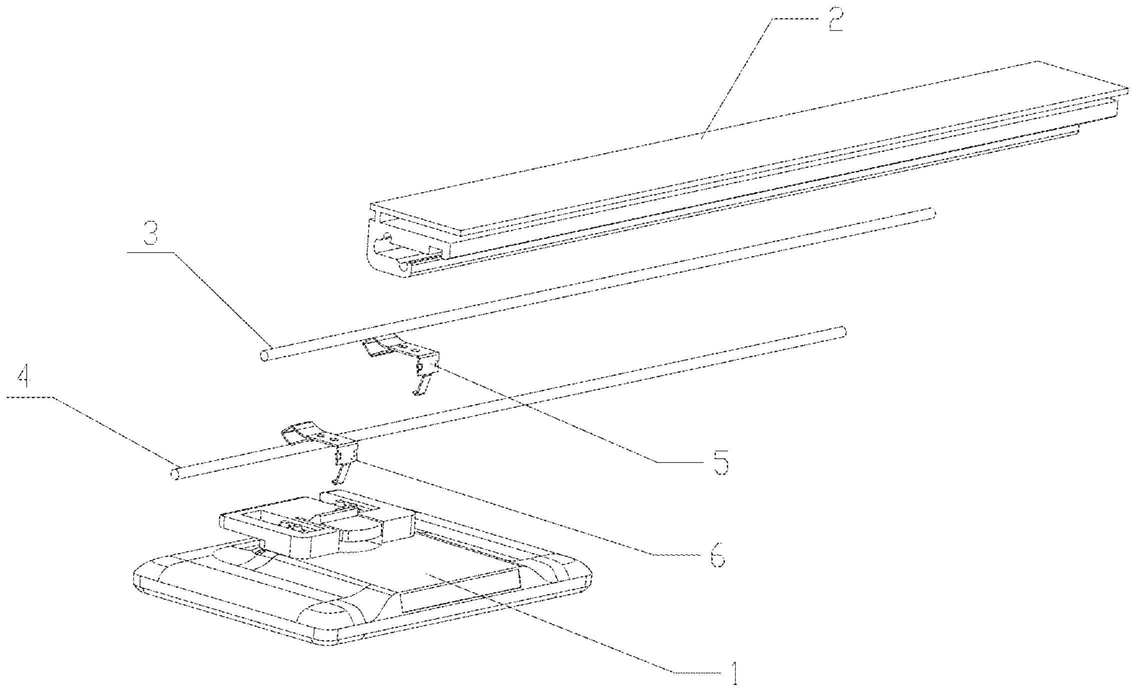
FIG. 1 is a schematic diagram of the structure of an active electronic shelf label according to an embodiment of the present disclosure.

Reference numerals in the drawings are as follows.

1: shelf label body;
101: plug;
1011: buckle;
102: shelf label shell;
103: printed circuit board;
104: display screen;
105: plastic sheet;
2: guide rail;
201: slot;
2011: groove;
3: guide rail positive power supply line;
4: guide rail negative power supply line;
5: shelf label positive elastic sheet;
6: shelf label negative elastic sheet.

DETAILED DESCRIPTION

For a clearer understanding of the objectives, technical features and effects of the embodiments of the present disclosure, specific embodiments will now be described with reference to the drawings. The described embodiments are intended only to schematically illustrate and explain this invention and do not limit the scope of the present disclosure.

The principle and spirit of the present disclosure will be introduced before the embodiments of the present disclosure.

In the existing electronic shelf label, a metal sheet on a shelf label body and a power supply line in a power supply guide rail are mainly contact with each other by rotation, so as to achieve the power supply and installation of the electronic shelf label. In this method, when the position of the electronic shelf label needs to be adjusted, the electronic shelf label should be rotatably disassembled from the power supply guide rail and rotatably installed again, resulting in low efficiency. In addition, the rotatable installation mode requires a pre-determined rotation radius, which requires an interval between the electronic shelf labels, resulting in a difficulty in setting the position of the electronic shelf label according to actual needs.

The inventor finds the above technical problems, and proposes an active electronic shelf label. By movably connecting a shelf label body to a guide rail, the active electronic shelf label can improve the efficiency of installing and disassembling the electronic shelf label, enable flexible adjustment of the position of the shelf label body on the guide rail according to actual needs. The active electronic shelf label provided by the embodiments of the present disclosure will be described in detail below.

The embodiments of the present disclosure provide an active electronic shelf label for improving the efficiency of installation and disassembly thereof. FIG. 1 is a schematic diagram of the structure of an active electronic shelf label according to an embodiment of the present disclosure. As shown in FIG. 1, the active electronic shelf label includes: a shelf label body 1, a guide rail 2, a guide rail positive power supply line 3, a guide rail negative power supply line 4, a shelf label positive elastic sheet 5 and a shelf label negative elastic sheet 6.

The shelf label body 1 is connected to and movable along the guide rail 2. The guide rail positive power supply line 3 and the guide rail negative power supply line 4 are provided along the guide rail 2, respectively. A first contact point of the shelf label positive elastic sheet 5 is electrically coupled to a power input terminal 106 of the shelf label body 1. A first contact point of the shelf label negative elastic sheet 6 is electrically coupled to a power output terminal 107 of the shelf label body 1. A second contact point of the shelf label positive elastic sheet 5 is electrically coupled to the guide rail positive power supply line 3, and a second contact point of the shelf label negative elastic sheet 6 is electrically coupled to the guide rail negative power supply line 4.

As illustrated in FIG. 1, in the embodiment of the present disclosure, the shelf label body is movably connected to the guide rail, the guide rail positive power supply line and the guide rail negative power supply line are provided along the guide rail, respectively, the first contact point of the shelf label positive elastic sheet is electrically coupled to the power input terminal of the shelf label body, the first contact point of the shelf label negative elastic sheet is electrically coupled to the power output terminal of the shelf label body, the second contact point of the shelf label positive elastic sheet is electrically coupled to the guide rail positive power supply line, and the second contact point of the shelf label negative elastic sheet is electrically coupled to the guide rail negative power supply line. Therefore, the present disclosure improves the efficiency of installing and disassembling the electronic shelf label, enables flexible adjustment of the position of the shelf label body on the guide rail according to actual needs, and is simple in structure, light in weight, and easy to maintain.

Figure 2:
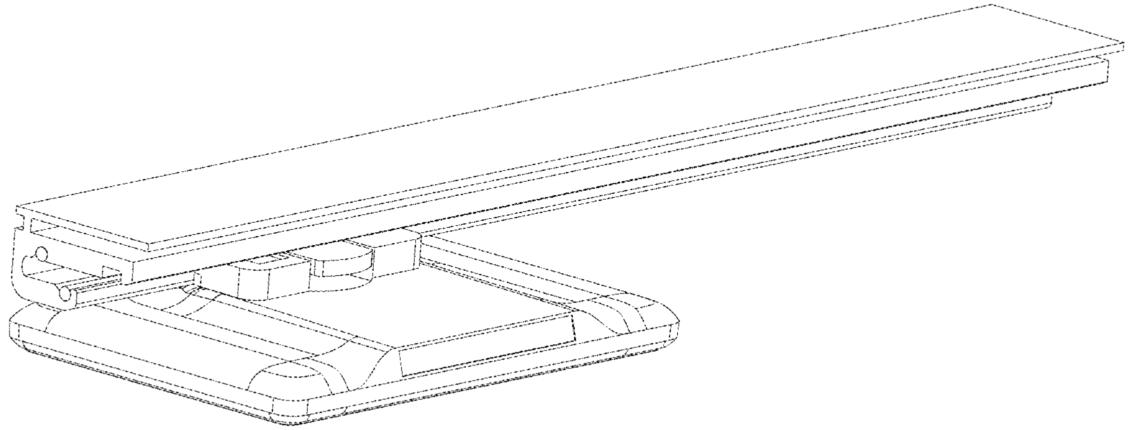
FIG. 2 is a schematic diagram of an active electronic shelf label in an assembled state according to an embodiment of the present disclosure.

During implementation, as illustrated in FIG. 1, which is the schematic diagram of the structure of the active electronic shelf label according to the embodiment of the present disclosure, the shelf label body 1 is movably connected to the guide rail 2, the guide rail positive power supply line 3 and the guide rail negative power supply line 4 are provided along the guide rail 2, respectively, the first contact point of the shelf label positive elastic sheet 5 is electrically coupled to the power input terminal of the shelf label body 1, the first contact point of the shelf label negative elastic sheet 6 is electrically coupled to the power output terminal of the shelf label body 1, the second contact point of the shelf label positive elastic sheet 5 is electrically coupled to the guide rail positive power supply line 3 by contact, and the second contact point of the shelf label negative elastic sheet 6 is electrically coupled to the guide rail negative power supply line 4 by contact, thus achieving the schematic diagram of the active electronic shelf label in an assembled state as illustrated in FIG. 2, so that the shelf label body 1 can slide along the guide rail 2 and a reliable power supply can be realized. The power input terminal and the power output terminal of the shelf label body 1 may be provided on a printed circuit board inside the shelf label body 1.

In an embodiment, the guide rail 2 is provided with a slot 201, and the shelf label body 1 is provided with a plug 101 movably inserted into the slot 201.

Figure 3:
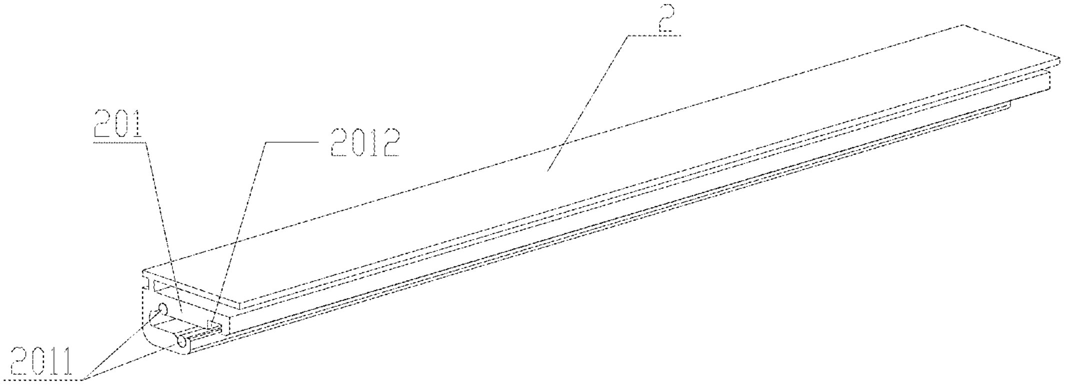
FIG. 3 is a schematic diagram of the structure of a guide rail according to an embodiment of the present disclosure.
Figure 4:
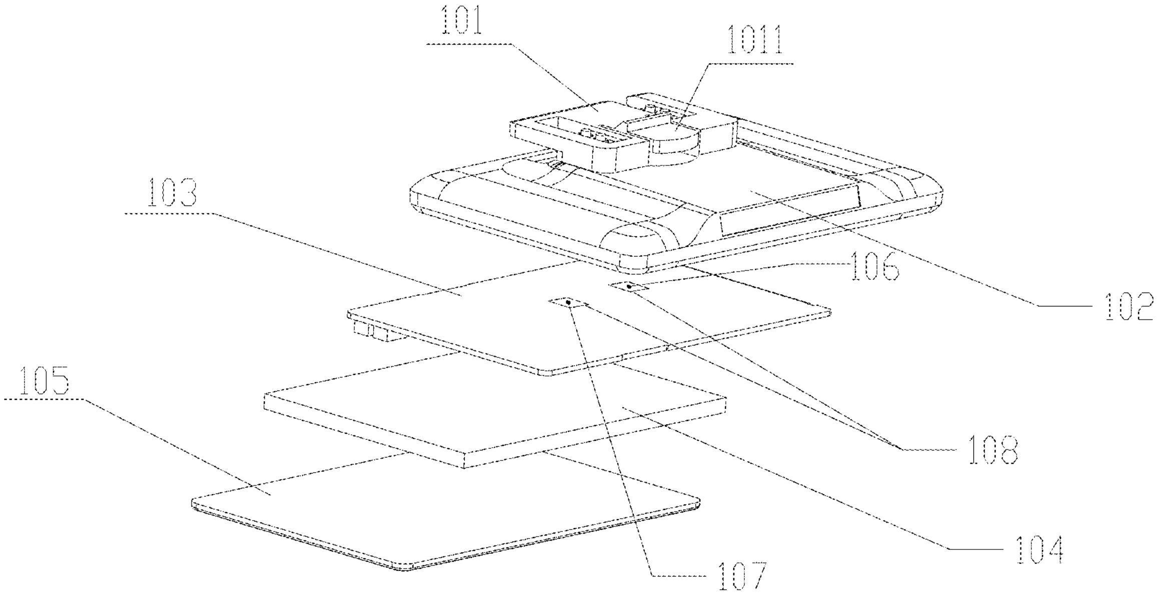
FIG. 4 is a schematic diagram of the structure of a shelf label body according to an embodiment of the present disclosure.

FIG. 3 is a schematic diagram of the structure of a guide rail according to an embodiment of the present disclosure, and FIG. 4 is a schematic diagram of the structure of a shelf label body according to an embodiment of the present disclosure. As illustrated in FIG. 3, the guide rail 2 is provided with a slot 201, and as illustrated in FIG. 4, the shelf label body 1 is provided with a plug 101 which may be provided on a back portion of the shelf label body 1. By movably inserting the plug 101 into the slot 201, the shelf label body 1 can move flexibly in a horizontal direction of the guide rail 2.

In an embodiment, an inner frame of the slot 201 is provided with two grooves 2011. The guide rail positive power supply line 3 and the guide rail negative power supply line 4 are provided on the guide rail 2 by respectively passing through the two grooves 2011.

During implementation, as illustrated in FIG. 3, the inner frame of the slot 201 of the guide rail 2 is provided with two grooves 2011. By respectively passing through the two grooves 2011, the guide rail positive power supply line 3 and the guide rail negative power supply line 4 can be fixed on the guide rail 2, respectively. The two grooves may be cylindrical grooves respectively located on upper and lower sides of the inner frame of the slot 201 and provided alternatively, so that the power supply lines of different polarities can be prevented from contacting each other. After the guide rail positive power supply line 3 and the guide rail negative power supply line 4 are respectively fixed on the guide rail 2, the plug 101 of the shelf label body 1 is movably inserted into the slot 201 of the guide rail 2, so that the second contact point of the shelf label positive elastic sheet 5 can be electrically coupled to the guide rail positive power supply line 3 by contact and the second contact point of the shelf label negative elastic sheet 6 can be electrically coupled to the guide rail negative power supply line 4 by contact, thus realizing the reliable power supply of the shelf label body 1.

In an embodiment, the inner frame of the slot 201 is provided with a buckle seat 2012, and the plug 101 is provided with a buckle 1011. The shelf label body 1 is fixed on the guide rail 2 by the buckle 1011 and the buckle seat 2012.

During implementation, as illustrated in FIG. 3, the inner frame of the slot 201 of the guide rail 2 is provided with the buckle seat 2012, and as illustrated in FIG. 4, the plug 101 of the shelf label body 1 is provided with the buckle 1011.

By pushing the buckle 1011 downward and inward, the buckle 1011 is fixed in the buckle seat 2012, thus fixing the shelf label body 1 in a vertical direction of the guide rail 2, and preventing the shelf label body 1 from falling off from the guide rail 2.

In an embodiment, the shelf label positive elastic sheet 5 and the shelf label negative elastic sheet 6 are fixed on the plug 101 by hot melting or gluing.

During implementation, in order to fix the shelf label positive elastic sheet 5 and the shelf label negative elastic sheet 6 with the shelf label body 1, the shelf label positive elastic sheet 5 and the shelf label negative elastic sheet 6 may be fixed on the plug 101 by hot melting or gluing.

In an embodiment, as illustrated in FIG. 4, the shelf label body 1 may include a shelf label shell 102 and a printed circuit board 103 provided therein, and the first contact point of the shelf label positive elastic sheet 5 and the first contact point of the shelf label negative elastic sheet 6 are electrically coupled to the printed circuit board 103, respectively.

In an embodiment, the printed circuit board 103 is provided with a copper-clad area 108, and the copper-clad area 108 is provided with a power input terminal 106 and a power output terminal 107.

The first contact point of the positive tab elastic sheet 5 passes through the shelf label shell 102 and is electrically coupled to the power input terminal on the copper-clad area of the printed circuit board 103, and the first contact point of the negative tab elastic sheet 6 passes through the shelf label shell 102 and is electrically coupled to the power output terminal on the copper-clad area of the printed circuit board 103.

In an embodiment, the first contact point of the shelf label positive elastic sheet 5 is electrically coupled to the power input terminal on the copper-clad area of the printed circuit board 103 by elastic contact, and the first contact point of the shelf label negative elastic sheet 6 is electrically coupled to the power output terminal on the copper-clad area of the printed circuit board 103 by elastic contact.

During implementation, the shelf label shell 102 is the shell of the electronic shelf label, and the printed circuit board 103 may be a PCB board. The printed circuit board 103 is provided with a copper-clad area, and the copper-clad area is provided with a power input terminal and a power output terminal. The first contact point of the shelf label positive elastic sheet 5 passes through the shelf label shell 102 and is electrically coupled to the power input terminal on the copper-clad area of the printed circuit board 103 by elastic contact, and the first contact point of the shelf label negative elastic sheet 6 passes through the shelf label shell 102 and is electrically coupled to the power output terminal on the copper-clad area of the printed circuit board 103 by elastic contact.

In one embodiment, as illustrated in FIG. 4, the shelf label body 1 may further include a display screen 104 provided on the shelf label shell 102, and the printed circuit board 103 is fixed on the display screen 104.

During implementation, the printed circuit board 103 may be fixed on the display screen 104 by gum to display shelf label information of the electronic shelf label.

In an embodiment, as illustrated in FIG. 4, the display screen 104 is provided with a plastic sheet 105 which is fixed on an outer frame of the shelf label shell 101.

Figure 5:
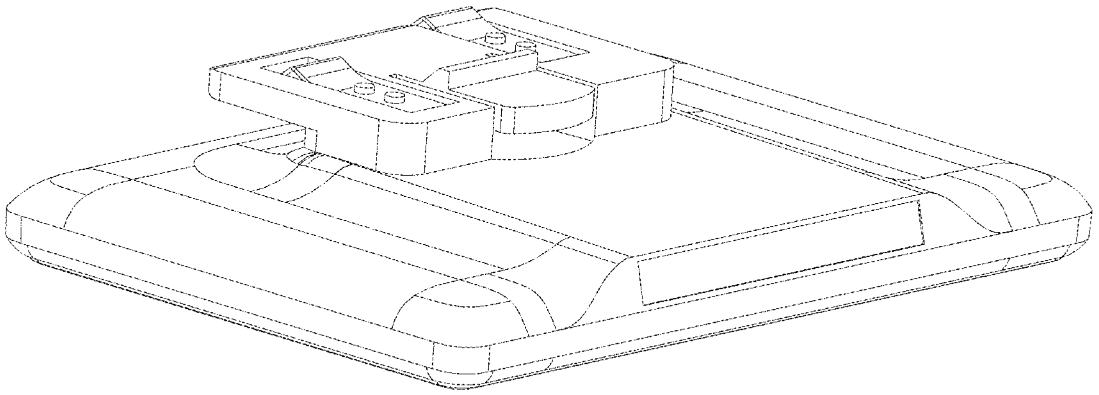
FIG. 5 is a schematic diagram of a shelf label body in an assembled state according to an embodiment of the present disclosure.

During implementation, the display screen 104 is provided with the plastic sheet 105 which is fixed on the outer frame of the shelf label shell 102 to protect the display screen 104. The plastic sheet 105 may be fixed on the outer frame of the shelf label shell 101 by gluing, dispensing or ultrasonic welding. By providing the printed circuit board 103 in the shelf label shell 102, providing the display screen 104 on the shelf label shell 102, and fixing the plastic sheet 105 on the outer frame of the shelf label shell 101, the assembly structure of the shelf label body as illustrated in FIG. 5 can be obtained.

An example is given below to facilitate the understanding of the implementation of the present disclosure.

Firstly, the shelf label body 1 is prepared: the printed circuit board 103 is provided in the shelf label shell 102 and fixed on the display screen 104 by gum; the plastic sheet 105 is fixed on the outer frame of the shelf label shell 101 by gluing or dispensing or ultrasonic welding to obtain the shelf label body 1; the plug 101 is provided on the back portion of the shelf label body 1, and the buckle 1011 is provided on the plug 101; the first contact point of the shelf label positive elastic sheet 5 passes through the shelf label shell 102 and is electrically coupled to the power input terminal on the copper-clad area of the printed circuit board 103 by elastic contact; the first contact point of the shelf label negative elastic sheet 6 passes through the shelf label shell 102 and is electrically coupled to the power output terminal on the copper-clad area of the printed circuit board 103 by elastic contact; and the shelf label positive elastic sheet 5 and the shelf label negative elastic sheet 6 are fixed on the plug 101 by hot melting or gluing.

Next, the guide rail 2 is prepared: a slot 201 is provided on the guide rail 2, two grooves 2011 and a buckle seat 2012 are provided on the inner frame of the slot 201, and the guide rail positive power supply line 3 and the guide rail negative power supply line 4 are fixed on the guide rail 2 by respectively passing through the two grooves 2011 of the guide rail.

When the shelf label body 1 is installed, the plug 101 of the shelf label body 1 is inserted into the slot 201 of the guide rail 2, so that the shelf label body 1 can move along the guide rail 2; and the buckle 1011 of the shelf label body 1 is pushed downward and inward, so that the buckle 1011 is fixed on the buckle seat 2012 of the guide rail 2. Meanwhile, the second contact point of the shelf label positive elastic sheet 5 is electrically coupled to the guide rail positive power supply line 3 by contact, and the second contact point of the shelf label negative elastic sheet 6 is electrically coupled to the guide rail negative power supply line 4 by contact.

When the shelf label body 1 is disassembled, the buckle 1011 of the shelf label body 1 is pulled downward and outward, so that the buckle 1011 is disengaged from the buckle seat 2012 of the guide rail 2; and the plug 101 of the shelf label body 1 is pulled out of the slot 201 of the guide rail 2, so that the shelf label body 1 is separated from the guide rail 2. Meanwhile, the second contact point of the shelf label positive elastic sheet 5 is separated from the guide rail positive power supply line 3, and the second contact point of the shelf label negative elastic sheet 6 is separated from the guide rail negative power supply line 4.

To sum up, according to the embodiments, the shelf label body is movably connected to the guide rail, the guide rail positive power supply line and the guide rail negative power supply line are respectively provided along the guide rail, the first contact point of the shelf label positive elastic sheet is electrically coupled to the power input terminal of the shelf label body, the first contact point of the shelf label negative elastic sheet is electrically coupled to the power output terminal of the shelf label body, the second contact point of the shelf label positive elastic sheet is electrically coupled to the guide rail positive power supply line, and the second contact point of the shelf label negative elastic sheet is electrically coupled to the guide rail negative power supply line. Therefore, the present disclosure improves the efficiency of installing and disassembling the electronic shelf label, enables flexible adjustment of the position of the shelf label body on the guide rail according to actual needs, and is simple in structure, light in weight, and easy to maintain.

The purpose, technical features and technical effects of the present disclosure have been further described above by means of some embodiments. It should be understood that the embodiments are meant to facilitate understanding of the principles of the present disclosure, rather than limit the scope of the present disclosure. Any modifications, alternations, improvements, etc., made by those skilled in the art without departing from the concepts and principles of this disclosure shall fall within the scope of the present disclosure.

The invention claimed is:

1. An active electronic shelf label, comprising:

a shelf label body, a guide rail, a guide rail positive power supply line, a guide rail negative power supply line, a shelf label positive elastic sheet, and a shelf label negative elastic sheet;

wherein the shelf label body is connected to and movable along the guide rail;

the guide rail positive power supply line and the guide rail negative power supply line are provided along the guide rail, respectively;

a first contact point of the shelf label positive elastic sheet is electrically coupled to a power input terminal of the shelf label body, and a first contact point of the shelf label negative elastic sheet is electrically coupled to a power output terminal of the shelf label body;

a second contact point of the shelf label positive elastic sheet is electrically coupled to the guide rail positive power supply line, and a second contact point of the shelf label negative elastic sheet is electrically coupled to the guide rail negative power supply line; and the guide rail is provided with a slot, the shelf label body is provided with a plug movable within the slot, and the shelf label positive elastic sheet and the shelf label negative elastic sheet are fixed on the plug.

2. The active electronic shelf label according to claim 1, wherein an inner frame of the slot is provided with two grooves; and the guide rail positive power supply line and the guide rail negative power supply line are provided on the guide rail by respectively passing through the two grooves.

3. The active electronic shelf label according to claim 1, wherein an inner frame of the slot is provided with a buckle seat, and the plug is provided with a buckle; and the shelf label body is fixed on the guide rail by the buckle and the buckle seat.

4. The active electronic shelf label according to claim 1, wherein the shelf label positive elastic sheet and the shelf label negative elastic sheet are fixed on the plug by hot melting or gluing.

5. The active electronic shelf label according to claim 1, wherein the shelf label body comprises a shelf label shell and a printed circuit board provided therein, and the first contact point of the shelf label positive elastic sheet and the first contact point of the shelf label negative elastic sheet are electrically coupled to the printed circuit board, respectively.

6. The active electronic shelf label according to claim 5, wherein the shelf label body further comprises a display screen provided on the shelf label shell, and the printed circuit board is fixed on the display screen.

7. The active electronic shelf label according to claim 6, wherein the display screen is provided with a plastic sheet, and the plastic sheet is fixed on an outer frame of the shelf label shell.

8. The active electronic shelf label according to claim 5, wherein the printed circuit board is provided with a copper-clad area, and the copper-clad area is provided with a power input terminal and a power output terminal; and the first contact point of the positive elastic sheet passes through the shelf label shell and is electrically coupled to the power input terminal on the copper-clad area of the printed circuit board, and the first contact point of the negative elastic sheet passes through the shelf label shell and is electrically coupled to the power output terminal on the copper-clad area of the printed circuit board.

9. The active electronic shelf label according to claim 8, wherein the first contact point of the shelf label positive elastic sheet is electrically coupled to the power input terminal on the copper-clad area of the printed circuit board by being in elastic contact with the power input terminal, and the first contact point of the shelf label negative elastic sheet is electrically coupled to the power output terminal on the copper-clad area of the printed circuit board by being in elastic contact with the power input terminal.

10. An active electronic shelf label, comprising:

a shelf label body;

a guide rail;

a guide rail positive power supply line;

a guide rail negative power supply line;

a shelf label positive elastic sheet;

a shelf label negative elastic sheet;

the shelf label body is connected to and movable along the guide rail;

the guide rail positive power supply line and the guide rail negative power supply line are provided along the guide rail, respectively;

the shelf label body includes a shelf label shell and a printed circuit board provided therein;

the printed circuit board is provided with a copper-clad area, and the copper-clad area is provided with the power input terminal and the power output terminal;

the first contact point of the positive elastic sheet passes through the shelf label shell and is electrically coupled to the power input terminal on the copper-clad area of the printed circuit board, and the first contact point of the negative elastic sheet passes through the shelf label shell and is electrically coupled to the power output terminal on the copper-clad area of the printed circuit board;

a second contact point of the shelf label positive elastic sheet is electrically coupled to the guide rail positive power supply line; and a second contact point of the shelf label negative elastic sheet is electrically coupled to the guide rail negative power supply line.

11. The active electronic shelf label according to claim 10, wherein the first contact point of the shelf label positive elastic sheet is electrically coupled to the power input terminal on the copper-clad area of the printed circuit board by being in elastic contact with the power input terminal, and the first contact point of the shelf label negative elastic sheet is electrically coupled to the power output terminal on the copper-clad area of the printed circuit board by being in elastic contact with the power output terminal.

12. An active electronic shelf label, comprising:

a shelf label body;

a guide rail;

a guide rail positive power supply line;

a guide rail negative power supply line;

a shelf label positive elastic sheet;

a shelf label negative elastic sheet;

the shelf label body is connected to and movable along the guide rail;

the guide rail positive power supply line and the guide rail negative power supply line are provided along the guide rail, respectively;

the shelf label body includes a shelf label shell and a printed circuit board provided therein;

the first contact point of the positive elastic sheet passes through the shelf label shell and is electrically coupled to the printed circuit board, and the first contact point of the negative elastic sheet passes through the shelf label shell and is electrically coupled to the printed circuit board; and a second contact point of the shelf label positive elastic sheet is electrically coupled to the guide rail positive power supply line; and a second contact point of the shelf label negative elastic sheet is electrically coupled to the guide rail negative power supply line.

13. The active electronic shelf label according to claim 12, wherein the first contact point of the shelf label positive elastic sheet is electrically coupled to the printed circuit board by being in elastic contact with the printed circuit board, and the first contact point of the shelf label negative elastic sheet is electrically coupled to the printed circuit board by being in elastic contact with the printed circuit board.

14. The active electronic shelf label according to claim 12, wherein the guide rail is provided with a slot, the shelf label body is provided with a plug movable within the slot.

15. The active electronic shelf label according to claim 14, wherein an inner frame of the slot is provided with two grooves; and the guide rail positive power supply line and the guide rail negative power supply line are provided on the guide rail by respectively passing through the two grooves.

16. The active electronic shelf label according to claim 14, wherein an inner frame of the slot is provided with a buckle seat; the plug is provided with a buckle; and the shelf label body is fixed on the guide rail by the buckle and the buckle seat.

17. The active electronic shelf label according to claim 12, wherein the shelf label positive elastic sheet and the shelf label negative elastic sheet are fixed on the plug by hot melting or gluing.

18. The active electronic shelf label according to claim 12, wherein the shelf label body further comprises a display screen provided on the shelf label shell, and the printed circuit board is fixed on the display screen.

19. The active electronic shelf label according to claim 18, wherein the display screen is provided with a plastic sheet, and the plastic sheet is fixed on an outer frame of the shelf label shell.

* * * * *